(12) United States Patent
Osborne

(10) Patent No.: US 10,654,223 B1
(45) Date of Patent: May 19, 2020

(54) CURING SHIELD

(71) Applicant: SPIRIT AEROSYSTEMS, INC., Wichita, KS (US)

(72) Inventor: George M. Osborne, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 11 days.

(21) Appl. No.: 16/178,980

(22) Filed: Nov. 2, 2018

(51) Int. Cl.
| *B32B 7/12* | (2006.01) |
| *B29C 65/00* | (2006.01) |
| *B29C 65/48* | (2006.01) |
| *B32B 27/08* | (2006.01) |
| *B32B 3/26* | (2006.01) |
| *B32B 37/00* | (2006.01) |

(52) U.S. Cl.
CPC ........ *B29C 66/006* (2013.01); *B29C 65/4835* (2013.01); *B29C 66/721* (2013.01); *B32B 3/266* (2013.01); *B32B 7/12* (2013.01); *B32B 27/08* (2013.01); *B32B 37/00* (2013.01); *Y10T 428/24008* (2015.01)

(58) Field of Classification Search
CPC .......... Y10T 428/24008; B29C 66/006; B32B 3/266; B32B 7/12; B32B 37/00
See application file for complete search history.

(56) References Cited

U.S. PATENT DOCUMENTS 4,819,409 A * 4/1989 Mahaffy ................... B65B 9/04
222/108

* cited by examiner

*Primary Examiner* — Alexander S Thomas
(74) *Attorney, Agent, or Firm* — Hovey Williams LLP

(57) ABSTRACT

A part assembly including a curing shield and a method for secondarily bonding two parts of the part assembly utilizing the curing shield. The method for secondary bonding includes fixing a base of a clip of a curing shield to a first surface of a first part. The curing shield includes a pad fixed to the clip. The clip has the base and a spine fixed to and extending away from the base and terminating at a distal end. The pad extends along at least a portion of a length of the spine between the base and the distal end. The method also includes applying adhesive along a faying surface of one of the first part and a second part. The second part is assembled to the first part along the faying surface so that the distal end of the clip extends toward the second surface and the curing shield defines a pocket adjacent the faying surface at least partly enclosed by the pad.

20 Claims, 7 Drawing Sheets

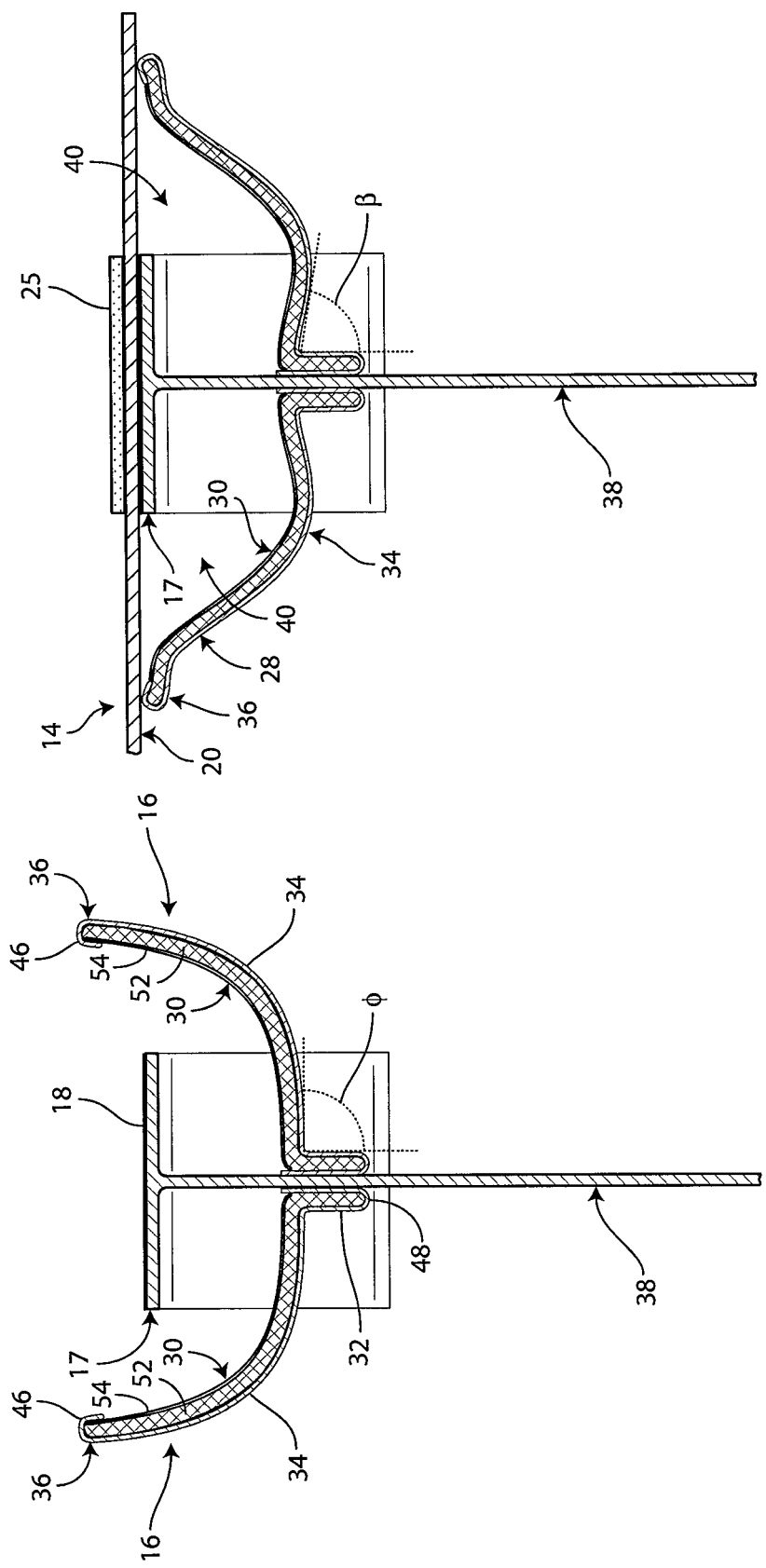

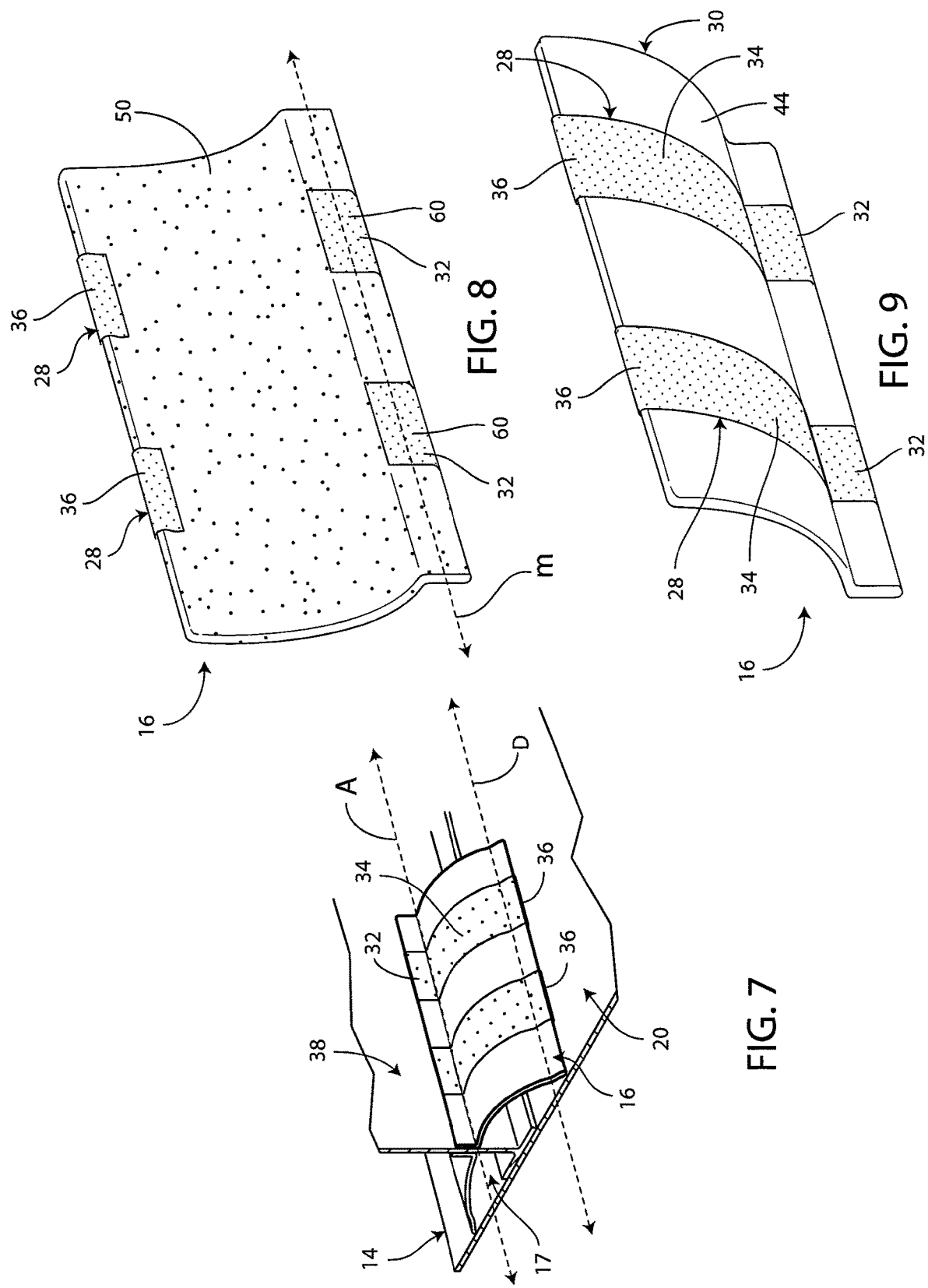

CURING SHIELD

BACKGROUND

Secondarily bonding composite parts generally requires application of a bonding substance such as a paste and/or film adhesive along joined surfaces of the parts. Heat and/or pressure may be required to cure the bonding substance and ensure a tight fit between the parts. Curing processes may lead to loss of the bonding substance from the joined surfaces, resulting in undesired "drips" onto surrounding objects.

Insulation may also be applied where a curing process includes the application of heat. However, present methods for insulating the joined surfaces are haphazard. Insulation may be difficult or impossible to apply in enclosed areas that cannot be easily accessed because of the nature of the assembled parts. For example, an electronics compartment may be formed by two composite parts in a manner that restricts or prohibits access to the compartment for insulation of the joined surfaces.

There is therefore a need for an improved method and apparatus for secondarily bonding composite parts.

SUMMARY OF THE INVENTION

Embodiments of the present invention provide for improved isolation of a faying surface during a curing process. For example, a curing shield according to an embodiment of the present invention may provide a removable barrier against adhesive drips that may be implemented in an area enclosed by assembled composite parts. For another example, the curing shield may comprise an insulation blanket protecting sensitive components and permitting application of heat in new configurations and to adhesives requiring curing temperatures that would be prohibitive without the curing shield. The curing shield may also include features that enhance reusability in embodiments of the present invention.

One embodiment of the invention is a method for secondarily bonding two parts of a part assembly utilizing a curing shield. The method for secondary bonding includes fixing a base of a clip of a curing shield to a first surface of a first part. The curing shield includes a pad fixed to the clip. The clip has the base and a spine fixed to and extending away from the base and terminating at a distal end. The pad extends along at least a portion of a length of the spine between the base and the distal end. The method also includes applying adhesive along a faying surface of one of the first part and a second part. The second part is assembled to the first part along the faying surface so that the distal end of the clip extends toward the second surface and the curing shield defines a pocket adjacent the faying surface at least partly enclosed by the pad.

Another embodiment of the invention is a part assembly including a first part having a first surface and a second part having a second surface. The assembly also includes a curing shield. The curing shield includes a pad fixed to a clip. The clip has a base and a spine fixed to and extending away from the base and terminating at a distal end. The pad extends along at least a portion of a length of the spine between the base and the distal end. The base of the clip is fixed to the first surface. The first part and the second part are joined together by an adhesive along a faying surface. The distal end of the clip extends toward the second surface and the curing shield defines a pocket adjacent the faying surface at least partly enclosed by the pad.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 5 is a fragmentary cross-sectional view of the assembly of FIG. 1 showing in detail the orientation of a curing shield fixed to the sidewall of the box;

FIG. 6 is a fragmentary cross-sectional view of the assembly of the curing shield and sidewall of FIG. 5 showing assembly of the lid thereon and resultant flexing of the curing shield;

FIG. 7 is a fragmentary bottom perspective view of the assembly of FIG. 1, showing in detail rotational axes of sections of the curing shield associated with flexing the curing shield;

FIG. 8 is a perspective view of a curing shield of the assembly of FIG. 1 showing in detail a midline of a base of the curing shield;

FIG. 9 is a perspective view of the curing shield taken from the opposite angle of FIG. 8 to show a back face of the curing shield.

Figure 1:
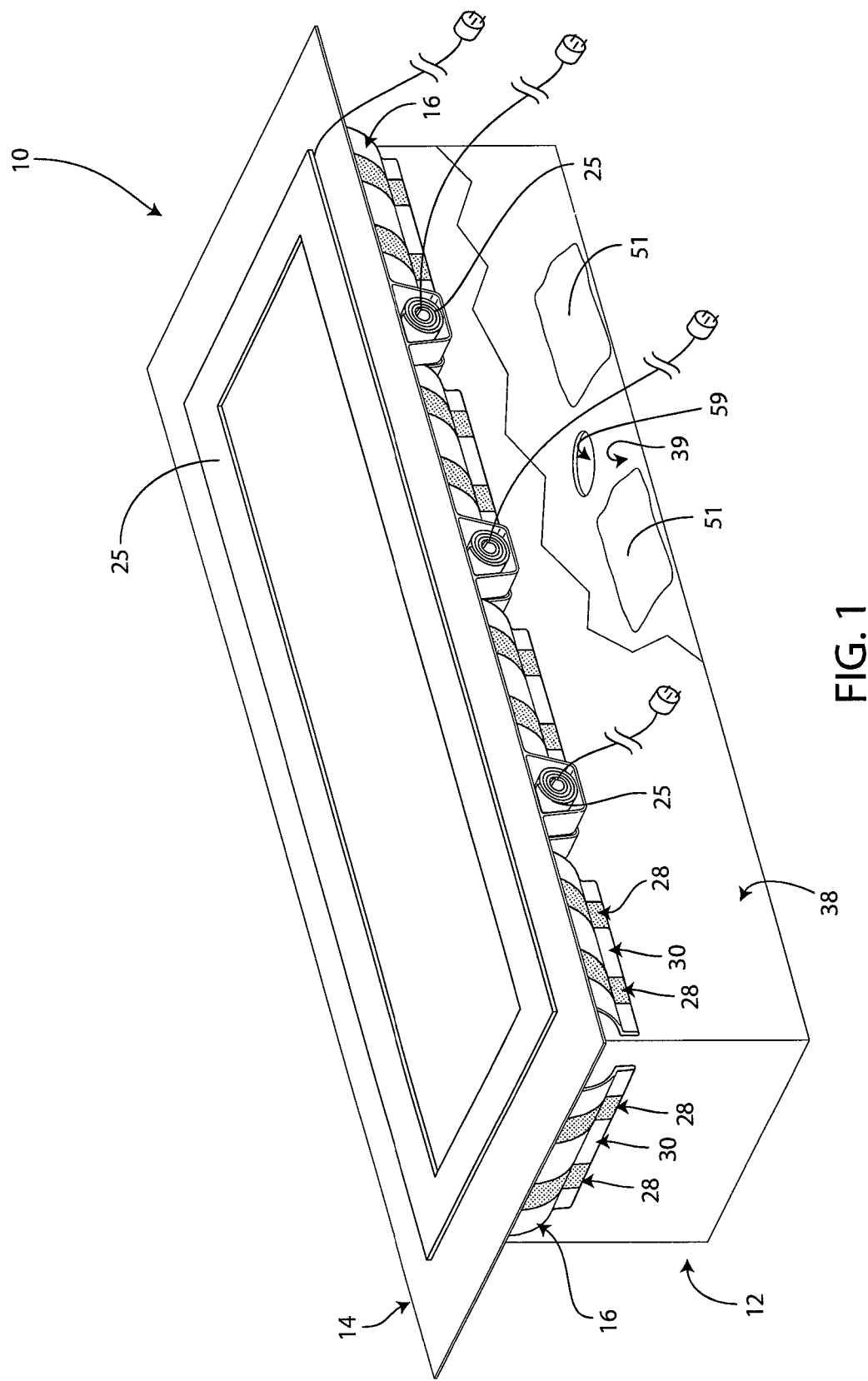
FIG. 1 is a perspective view of a part assembly constructed according to embodiments of the present invention.
Figure 2:
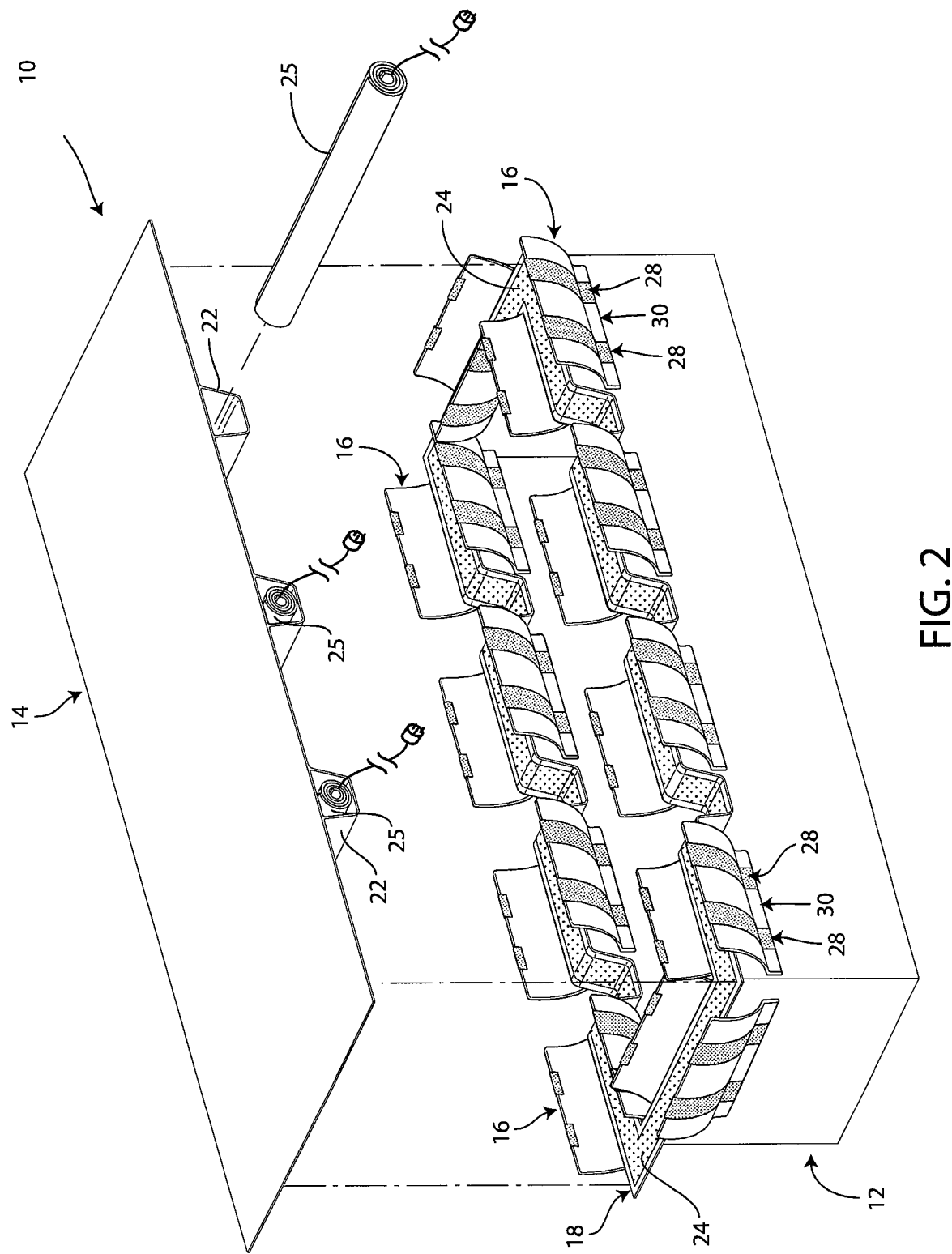
FIG. 2 is a partially exploded perspective view of the assembly of FIG. 1 without an overlying heating element.
Figure 3:
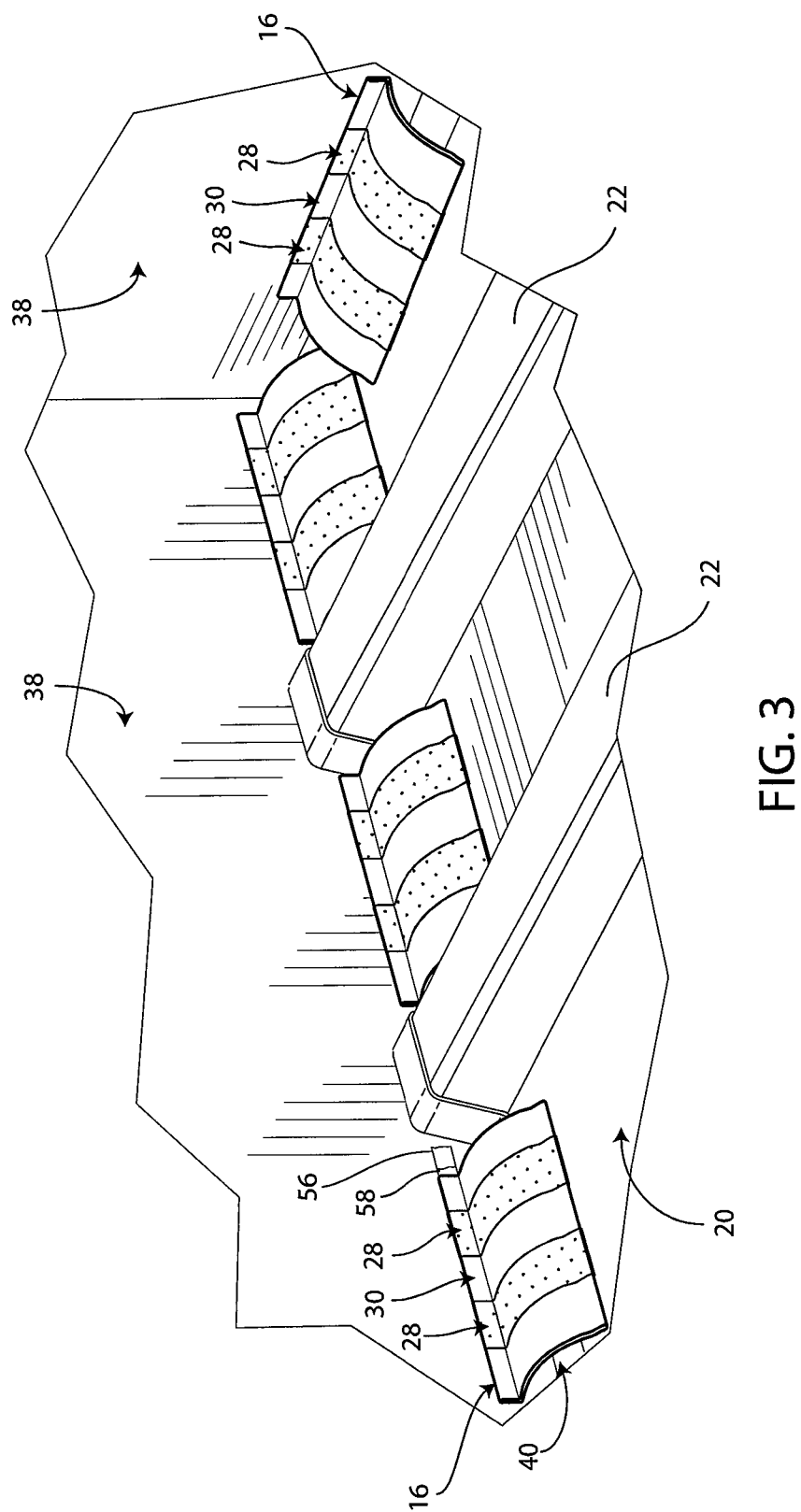
FIG. 3 is a fragmentary bottom perspective view of the assembly of FIG. 1, showing in detail an interior of a sidewall of a box, a bottom surface of a lid, and curing shields.
Figure 4:
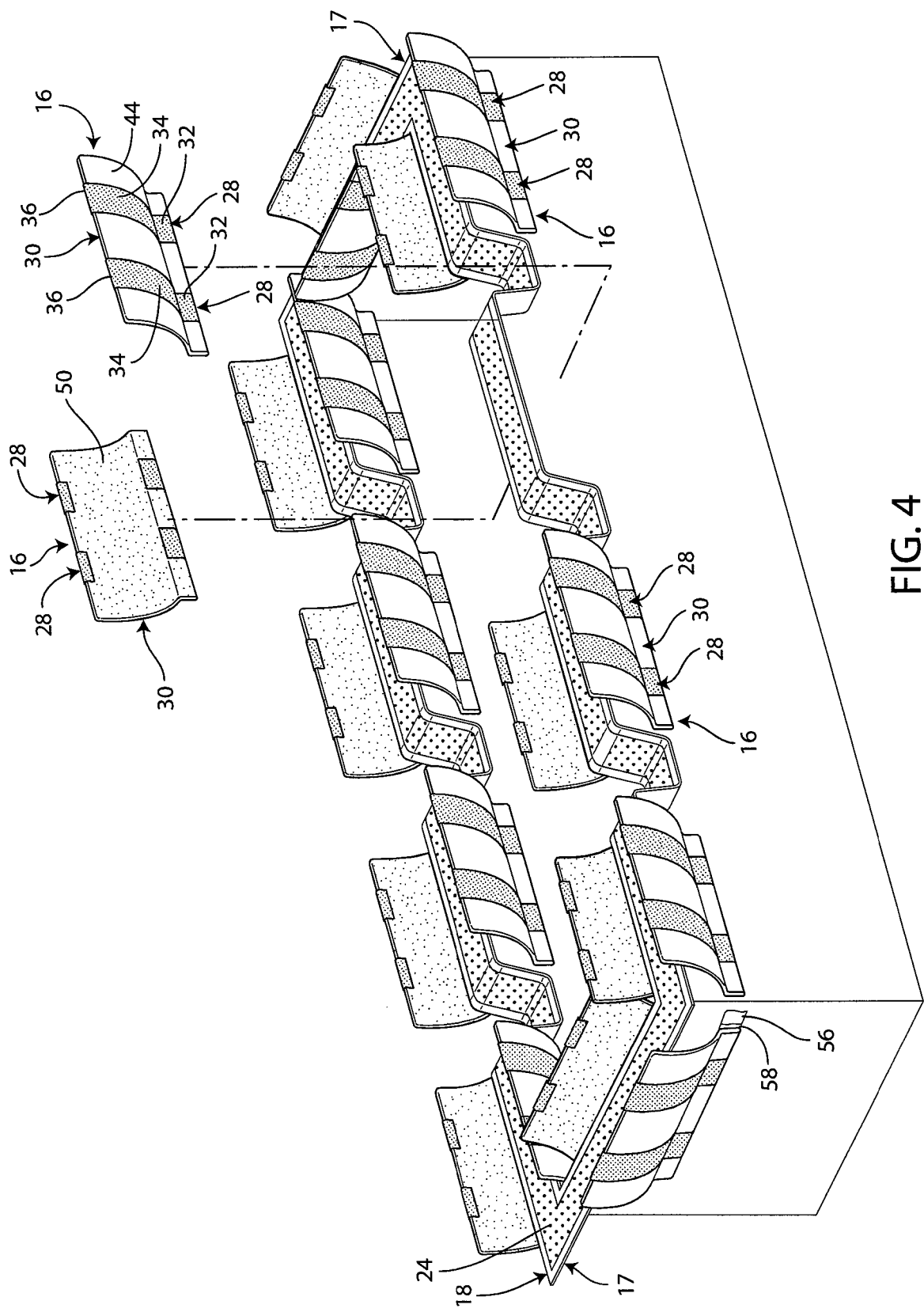
FIG. 4 is a partially exploded view of the assembly of FIG. 1 without the lid.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

An improved secondary bonding part assembly 10 constructed in accordance with embodiments of the present invention is illustrated in FIG. 1. The assembly 10 includes a composite box 12, composite lid 14, and curing shields 16. Turning to FIGS. 1-4 more generally, the box 12 is crowned by a flange 17 presenting an undulating faying surface 18. The lid 14 includes an undulating bottom surface 20 of complementary shape to the faying surface 18. More particularly, the bottom surface 20 of the lid 14 is shaped to be securely keyed to and sealed against the faying surface 18. (See FIG. 3)

The undulation of the bottom surface 20 of the lid 14 results from stringers 22 formed in the lid 14. The stringers 22 are essentially hollow stiffening members intended to strengthen the lid 14 against buckling under compression or shear loads. However, it is foreseen that parts of a secondary bonding part assembly may be variously-shaped and oriented, provided that two bonded parts are substantially complementary in shape and in substantially continuous contact along the faying surface, without departing from the spirit of the present invention. For example, faying surfaces may be substantially planar within the scope of the present invention.

The box 12 and lid 14 preferably comprise similar composite materials, for instance materials having similar or identical coefficients of thermal expansion (CTEs), for use in aerospace applications or the like. In an embodiment, the parts 12, 14 may comprise composite laminate skins or the like composed of CFRP or glass fiber reinforced plastic (GFRP). However, one of ordinary skill will appreciate that the parts may comprise a variety of materials, and that two bonded parts may comprise different materials, within the scope of the present invention.

The preferred assembly 10 discussed herein defines an electronics bay for use in aerospace applications. It is foreseen that composite parts of a secondary bonding part assembly may be of a wide variety of configurations and be utilized in motor vehicle manufacturing, aerospace manufacturing, railroad manufacturing, ship and boat manufacturing, other transportation equipment manufacturing and/or in any other industry without departing from the spirit of the present invention.

Film adhesive 24 is applied to the faying surface 18 about substantially the entire perimeter of the box 12. It is foreseen that adhesive may alternatively or additionally be applied to a complementary surface of an assembly (e.g., the bottom surface 20 of lid 14) without departing from the spirit of the present invention. It is also foreseen that adhesive may be substantially continuously or intermittently applied without departing from the spirit of the present invention.

The film adhesive 24 may comprise an epoxy film. One of ordinary skill will appreciate that various adhesives are within the scope of the present invention. For example, it is foreseen that epoxies, polyurethanes, silicones, polysulfides and the like in paste, liquid, film or other forms may be utilized without departing from the spirit of the present invention. A plurality of heating elements 25—illustrated in the form of heating pads—are distributed about the assembly 10 adjacent the faying surface 18. The heating elements 25 are preferably positioned to apply heat to a skin surface of the lid 14 (and/or the box 12, if desired) directly opposite the faying surface 18 so that the skin may conduct the heat to the faying surface 18 to cure the film adhesive 24, as described in more detail below. It is foreseen that heat sources other than blankets—such as infrared lamps, out-of-oven and/or autoclave apparatuses—may be alternatively or additionally used to cure heat-activated adhesive(s) without departing from the spirit of the present invention.

The assembly 10 also includes a plurality of curing shields 16 constructed according to embodiments of the present invention. The shields 16 each comprise clips 28 fixed to a corresponding pad 30. Each clip 28 includes a base 32 and a spine 34 fixed to and extending away from the base 32 to terminate in a distal end 36. The base 32 is fixed to a surface of a sidewall 38 of the box 12. (See FIG. 5) The box 12 also includes a bottom wall 39. (See FIG. 1)

Upon assembling the lid 14 to the box 12, each distal end 36 extends toward the bottom surface 20 of the lid 14 and the corresponding pad 30 extends at least part of the length of the spine 34 to at least partly define a pocket 40. That is, the sidewall 38 of the box 12, the bottom surface 20 of the lid 14 (and/or a bottom of the flange 17), and the pad 30 preferably cooperatively define the pocket 40 immediately adjacent the faying surface 18. In the preferred embodiment, the distal end 36 of each clip 28 rests against the bottom surface 20 of the assembled lid 14, and the pad 30 extends substantially the entire length of the spine 34 such that the pocket 40 is substantially enclosed on three (3) sides by the sidewall 38, bottom surface 20 (and/or the bottom of the flange 17) and pad 30 to form a drip and/or insulative barrier or shield for curing of the adhesive 24, as discussed in more detail below.

Each pad 30 may be fixed to a corresponding clip 28 along the length of the spine 34, at the base 32 and/or at the distal end 36. In the preferred embodiment, the spine 34 extends along and supports a back face 44 of the pad 30 (see FIG. 9), with the distal end 36 and the base 32 respectively forming foldover clips 46, 48 bent about a front face 50 (see FIG. 8) of the pad to clamp and hold the pad 30 against the clip 28. (See also FIG. 5) It is foreseen that a pad may be fixed to a clip using adhesives, mechanical fasteners or other fasteners without departing from the spirit of the present invention. One of ordinary skill will also appreciate that a pad that does not extend the entire length of a spine is within the scope of the present invention.

It should be noted that the preferred embodiment of curing shield 16 includes two (2) clips 28 spaced along and fixed to each pad 30 to support the length of a relatively low rigidity pad 30 and prevent substantial sagging upon assembly. However, it is foreseen that more or fewer clips and/or that a single unitary clip of varying dimensions may be used to support a pad without departing from the spirit of the present invention. For instance, using a material of greater rigidity for a pad may require fewer supporting clips along the length of the pad to prevent substantial sagging upon assembly.

In addition, a plurality of curing shields 16 are fixed along the perimeter of the box 12. More particularly, the curing shields 16 are regularly spaced along substantially the entirety of inner and outer surfaces of the sidewall 38 adjacent the faying surface 18. The curing shields 16 are intermittently spaced along the perimeter to accommodate the stringers 22 of the lid 14 therebetween. (See FIG. 3) It is foreseen that one or more curing shields may be used in an assembly, and that multiple curing shields may be otherwise distributed/positioned adjacent a faying surface, without departing from the spirit of the present invention.

Returning briefly to FIG. 1, drip cloths 51 may be placed along the bottom wall 39 of the box 12 below the intervening spaces between curing shields 16. The drip cloths 51 may catch drips that fall from the faying surface 18 between the curing shields 16 during curing processes, as described in more detail below.

The pad 30 may comprise one or both of an insulating core 52 and a nonstick surface 54. (See FIG. 5) In the preferred embodiment, the insulating core 52 and the nonstick surface 54 are both included, providing improved insulation of the faying surface 18 and protection against drips from the film adhesive 24. The preferred insulating core 52 comprises a flexible sheet of ten ounce per square yard (10 oz./sq. yd.) continuous filament polyester fiber insulation. However, an insulating core may comprise any insulating material, such as ceramic fiber, vermiculite, aerogel, glass bubbles, fiber glass and/or foams (e.g., polystyrene) within the scope of the present invention. One of ordinary skill will appreciate that a pad lacking an insulating core is also within the scope of the present invention.

The nonstick surface 54 may comprise a nonstick release film (e.g., fluorinated ethylene propylene (FEP) or another fluoropolymer) which may be sprayed onto and/or wrapped about the insulating core 52 and allowed to cure (where applicable). It is foreseen that various nonstick compounds and coatings may be utilized to reduce adhesion of drips to curing shields without departing from the spirit of the present invention. It is also foreseen that a nonstick compound or coating may be omitted without departing from the spirit of the present invention.

The curing shields 16 are fixed to the box 12 using a two-stage adhesive interface. More particularly, the two-stage interface preferably comprises a tape layer 56 and an adhesive layer 58. (See FIGS. 3-4) The tape layer 56 may comprise a carrier material or backing and an adhesive coating on a side opposite the adhesive layer 58. An exemplary tape layer 56 may comprise polyester multipurpose tape coated with a pressure sensitive silicone adhesive, such as fiberglass flash breaker tape(s) coated with fluoroplastic-silicone adhesives offered under the trademark Teflon® by The Chemours Company FC LLC.

The adhesive layer 58 may comprise any type of adhesive, including drying adhesive, pressure sensitive adhesive, contact adhesive, hot melt adhesive, multi-part adhesive, natural adhesive and/or synthetic adhesive. In a preferred embodiment, the adhesive layer 58 may comprise a drying adhesive, and/or a hot-melt adhesive applied in molten form and cooled, to fix the curing shield 16 to one of the composite parts, as described in more detail below.

As noted above the tape layer 56 and adhesive layer 58 are preferably positioned along and/or comprise an interface along which the base 32 is fixed to the sidewall 38. The tape layer 56 may be exposed and may extend beyond the interface. More particularly, the tape layer 56 may extend along the sidewall 38 beyond the curing shield 16 and adhesive layer 58.

In this manner, the tape layer 56 may be fixed to the sidewall 38, the adhesive layer 58 may be fixed to the tape layer 56 and to the base 32, the film adhesive 24 may be cured to fix the lid 14 to the box 12 (as discussed in more detail below), and the exposed portion of the tape layer 56 may be pulled to remove the curing shield 16 from the sidewall 38 after curing. Preferably, the curing shields 16 may be manually removed via a hole 59 in the bottom wall 39 (see FIG. 1) or a hole in the sidewall 38 (not shown).

It is foreseen that various methods for removably fixing curing shields to composite parts may be employed without departing from the spirit of the present invention. That is, more, fewer and/or different adhesive layers, mechanical fasteners and/or interlocking parts may be used to fix curing shields to a composite part. For example, a tape layer and adhesive layer may comprise a carrier material or backing coated on two sides with an adhesive. For another example, one or more vacuum cups may be attached to each base of each curing shield, the vacuum cups being in fluid communication with a vacuum source (e.g. a vacuum pump) and attachable to the composite part through application of a negative (vacuum) pressure to the cup(s). In this manner, removal of the curing shields from the composite part may include lessening or removing the negative pressure applied to the cup(s). One or ordinary skill will also appreciate that curing shields may be fixed to a variety of surfaces along one or both of two assembled parts within the scope of the present invention.

The base 32 and spine 34 of each clip 28 are preferably attached to one another along a rotational axis A. (See FIG. 7) At rest, adjacent portions of the base 32 and the spine 34 along the rotational axis A may form a resting angle $\phi$ therebetween. (See FIG. 5) After fixing the base 32 to the sidewall 38, the spine 34 may be rotated or bent from the resting angle $\phi$ about the rotational axis A to receive the lid 14. (See FIG. 6) Preferably, a resilient material forms the juncture between the base 32 and the spine 34 along the rotational axis A, and a bending moment is induced in the resilient material by rotating the spine 34 about the rotational axis A. The bending moment, in turn, leads to application of force by the distal end 36 against the bottom surface 20 of the lid 14 during assembly as the spine 34 forms a new assembled angle $\beta$ with the base 32. The continuous upward force on the spine 34 preferably maintains a loose seal and/or at least intermittent contact with the bottom surface 20 of the lid 14 along the length of the pad 30 for improved insulation and/or protection against drips.

Removal of the lid 14 will preferably cause the spine 34 to resiliently rebound toward or to the original resting angle $\theta$. In an embodiment, the resting angle $\phi$ may be between eighty and one-hundred and sixty degrees (80°-160°), and the new assembled angle $\beta$ may be between fifty and one hundred and thirty degrees (50°-130°), it being understood that the resting angle $\phi$ is greater than the assembled angle $\beta$ in the illustrated embodiment. One of ordinary skill will appreciate that a curing shield may be otherwise constructed—including by omitting a resilient joining structure between spine and base—within the scope of the present invention.

Moreover, at least two sections of the base 32, the spine 34, the juncture between the base 32 and the spine 34, and the distal end 36 of the clips 28 exhibit different moments of inertia when bent around axes parallel to the rotational axis A. For instance, the base 32 may include a substantially planar surface 60 configured to abut the interface formed by the tape and adhesive layers 56, 58 against the sidewall 38. The surface 60 may have a surface area (see FIG. 8) bisected by a midline M parallel to the rotational axis A. Preferably, the moment of inertia in the base 32 about the midline M is between two and six (2-6) times greater than the moment of inertia about the rotational axis A—in each case with reference to angular acceleration introduced at the distal end 36 by assembly of the lid 14 to the box 12—permitting enhanced flexibility of the spine 34 about the rotational axis A while resisting bending of the supporting base 32 about the midline M. In turn, the moment of inertia about the clip's 28 rotational axis A may be two to six (2-6) times greater than the moment of inertia at an axis D of a section of the distal end 36 that is also parallel to the rotational axis A. The enhanced flexibility of the distal end 36 may enable receipt of and conformance to the bottom surface 20 of the lid 14, forming an improved fit along the corresponding edge of the pad 30 and thereby improving insulation and/or drip-protection.

Varying flexibility along sections of curing shield clips may be attributable to specialized joints incorporated into the clips and/or to varying material properties throughout the clips. In the preferred embodiment, the clips 28—including the base 32, spine 34, the juncture between the base 32 and the spine 34, and the distal end 36—comprise the same material, with at least two of the foregoing sections being formed with different thicknesses of the material and the varying thicknesses accounting for the varied moments of inertia described above.

Preferably, the clip 28 comprises a plain weave carbon fiber reinforced polymer or carbon fiber reinforced thermoplastic (CFRP, CRP, or the like). A clip 28 comprising CFRP may have a base 32 that is four (4) plies thick, a spine 34 and juncture between the base 32 and the spine 34 that are each two (2) plies thick, and a distal end 36 that is one (1) ply thick. One of ordinary skill will appreciate that clips comprising different materials and/or structures for varying flexibility and/or bending stiffness along clips, as well as clips of consistent bending stiffness, are within the scope of the present invention.

Figure 10:
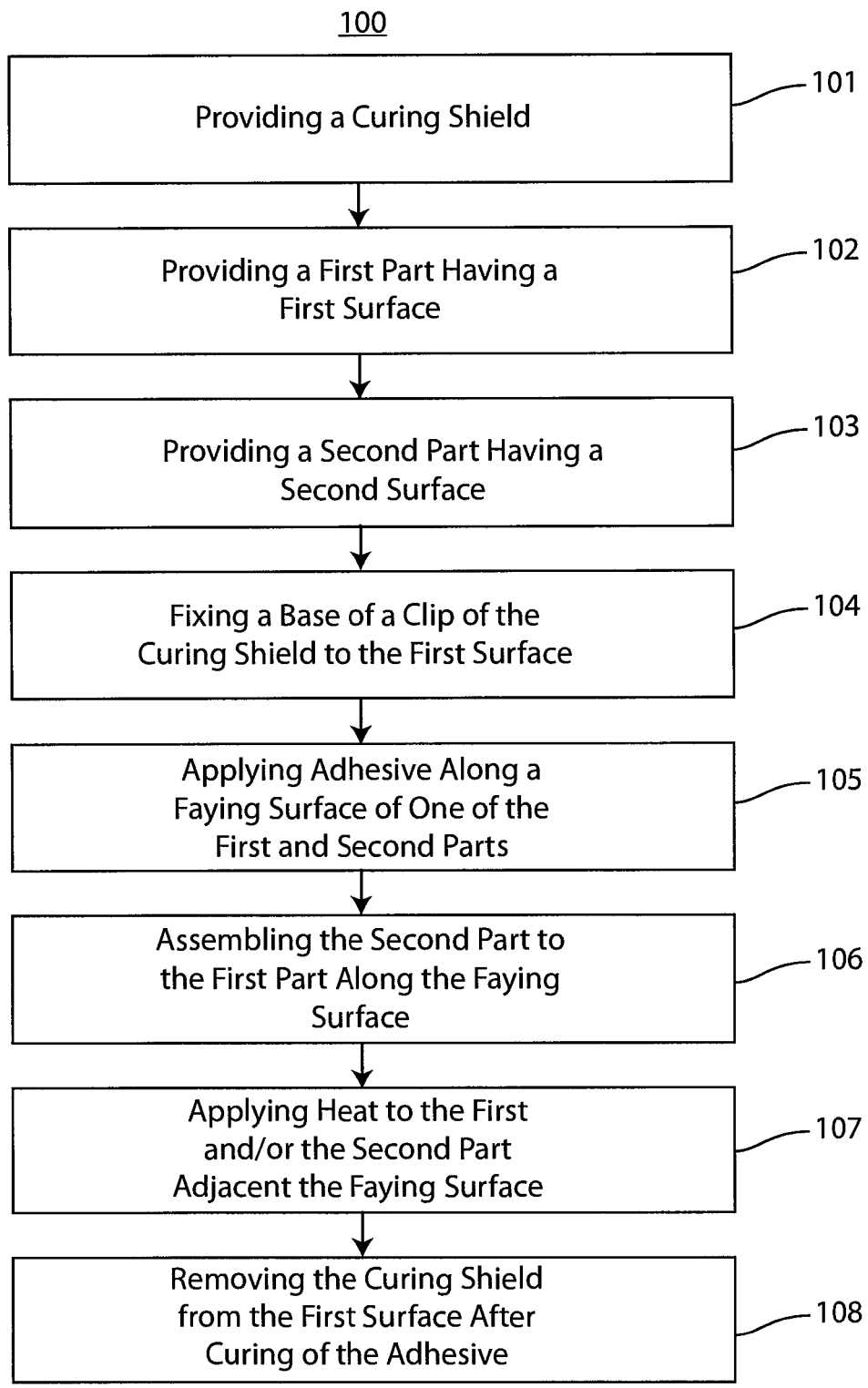
FIG. 10 is a flow chart illustrating a method for secondarily bonding two parts of a part assembly utilizing a curing shield in accordance with embodiments of the present invention.

Method steps for bonding parts will now be described in more detail, in accordance with various embodiments of the present invention. The steps of the method 100 may be performed in the order as shown in FIG. 10, or they may be performed in a different order. Furthermore, some steps may be performed concurrently as opposed to sequentially. In addition, some steps may not be performed.

As illustrated in FIG. 10, the method 100 for bonding parts may include providing a curing shield, as depicted in block 101. As discussed above, the curing shield may include a pad fixed to a clip. The clip may have a base and a spine fixed to and extending away from the base. The spine may terminate at a distal end of the clip. The pad may extend along at least a portion of a length of the spine between the base and the distal end. The pad may comprise an insulating pad. The pad may also or alternatively comprise a non-stick coating for receiving adhesive drips during a curing process described below. It is foreseen that curing shields of alternative compositions are within the scope of the present invention.

The method 100 may also include the step of providing a first part having a first surface, as depicted in block 102. The method 100 similarly may include the step of providing a second part having a second surface, as depicted in block 103. The first part and the second part may respectively comprise a box and lid, as discussed in more detail above, or any two of a variety of complementary parts—such as composite parts of transportation equipment of various types—within the scope of the present invention.

The method 100 may also include fixing the base of the clip of the curing shield to the first surface, as depicted in block 104. Fixing the base of the clip to the first surface may include applying adhesive and tape along one of the first surface and the base to form an interface and assembling the base to the first surface along the interface so that a portion of the tape is exposed. Alternatively, the base of the clip may be mechanically or otherwise fastened to the first surface, for example via an interference fit, mechanical fastener and/or interlocking mechanism.

One of ordinary skill will appreciate that step 104 may be repeated for each clip attached to the first part. Preferably, where multiple curing shields are fixed to the first part at intervals (with spaces intervening between the shields) drip cloths such as polyester scrim cloths may be placed along a bottom wall of one of the first and second parts in the intervening spaces to catch adhesive drips from the faying surface (discussed below).

The method 100 may also include applying adhesive along a faying surface of one of the first part and the second part, as depicted in block 105. The adhesive may be a film adhesive. However, one of ordinary skill will appreciate that a variety of adhesives may be applied for joining the first and second parts within the scope of the present invention. It is also foreseen that the adhesive may be applied to complementary faying surfaces of the first part and the second part without departing from the spirit of the present invention. Additional pre-cure preparatory steps may also be performed within the scope of the present invention.

The method may also include assembling the second part to the first part along the faying surface, as depicted in block 106. One of ordinary skill will appreciate that various mating structures may be utilized between the composite parts of the assembly—for example, in view of varying assembly/curing processes and/or manufacturing tolerances—within the scope of the present invention.

Upon assembly, the distal end of the clip may extend toward the second surface of the second part and the curing shield may define a pocket adjacent the faying surface at least partly enclosed by the pad. More particularly, the distal end of the clip may contact the second surface of the second part and the insulating pad may substantially enclose and insulate the pocket.

Prior to assembling the second part to the first part, the spine of the clip may extend away from the base at an original, resting angle. However, upon assembly of the second part to the first part, contact between the distal end of the clip and the second surface of the second part may cause the spine to rotate around the base of the clip to form a second, assembled angle with respect to the base. The bending about the base may be performed about a rotational axis.

Moreover, the base may be fixed to the first part along a substantially planar surface of the base having an area bisected by a midline parallel to the rotational axis. A moment of inertia about the midline of the base may be at least twice the moment of inertia about the rotational axis. This may permit the spine to rotate with relative ease for receiving the lid, while the base remains rigidly fixed against the first surface in support of the spine and/or distal end of the clip. In addition, the distal end of the clip may exhibit a moment of inertia less than that of the spine (as described in more detail above), enabling the distal end to better receive, conform to and partially seal against the second surface of the second part. Thus, the preferred variable rigidity of the clip provides for enhanced insulation and/or drip-catching during curing.

Preferably, fixing clips to the first surface before assembly of the second part to the first part advantageously enables insulation of and/or drip-catching from the faying surface inside a compartment or bay that is substantially enclosed and, potentially, otherwise inaccessible during curing as a result of assembly of the parts.

The method 100 may also include applying heat to the first and/or the second part adjacent the faying surface, as depicted in block 107. Heat may be applied by heating pads or other heating elements placed along an exposed or otherwise accessible surface (e.g., inside a stringer 22 described above) of one of the first and second parts as near as possible to the portion of the faying surface to be heated for adhesive curing. Preferably, each heating element is placed on a skin surface of one of the parts immediately opposite the faying surface to provide a direct path for heat conduction between the heating element and the faying surface.

One of ordinary skill will appreciate that the position and output of the heating elements will depend at least partly on: the curing properties of the chosen adhesive; the glass transition temperature ($T_g$) or similar critical property(ies) of the part(s) themselves; the thickness or other aspects of the part(s) (e.g., the skin separating the heating element from the faying surface) relevant to effectiveness and efficiency of heat transfer to the faying surface; proximity of heat-sensitive components that may be damaged by the required application of heat; and other factors. One of ordinary skill will also appreciate that curing with heat may be excluded in embodiments where the adhesive(s) do not require curing, and that a variety of curing procedures may be utilized without departing from the spirit of the present invention.

Preferably, in embodiments utilizing a heat-activated adhesive, the adhesive may be selected for strength and durability in view of the required curing temperature range and the amount of heat that can be safely conducted to the faying surface through one or both part(s) without damaging surrounding heat-sensitive components and/or reaching the glass transition temperature ($T_g$) of the heat conducting part(s). In part, the selection of a heat-activated adhesive may require consideration of the insulating properties of the curing shield, which may both protect surrounding heat-sensitive components and reduce the heat transfer rate through the part(s) required for bringing the faying surface within the required curing temperature range, as discussed in more detail below. In this way, the curing shield(s) may advantageously enable use of previously-unavailable adhesives for the application(s) in question.

More particularly, it has been shown that an assembly employing embodiments of an insulative curing shield of the present invention may reach a required curing temperature range along a faying surface more easily, and with less risk to surrounding heat-sensitive components and composite part(s) of the assembly. For instance, a curing process may involve application of heat to a faying surface through skin of a first part, without an insulating curing shield adjacent the faying surface. During the curing process, the application of consistent heat output may lead to sub-optimal curing temperatures at the faying surface, increased heat source temperatures, and increased temperature in a compartment adjacent the faying surface that houses heat-sensitive components (e.g., electronics). In contrast, performing the same curing process with addition of one or more curing shields for insulating the faying surface (substantially in accordance with the preferred embodiment disclosed above) may enable the faying surface to reach an optimal curing temperature while decreasing heat source and adjacent compartment temperatures significantly.

In this manner, embodiments of the present invention advantageously permit manufacturers to choose higher curing temperature-adhesives while protecting heat-sensitive components and composite parts of an assembly from increased temperatures during a curing process.

The method 100 may also include removing the base of the curing shield from the first surface after curing the adhesive, as depicted in block 108. In a preferred embodiment, an exposed portion of tape forming an interface fixing the base to the first surface is pulled to break the interface and remove the base from the first surface. Also preferably, removal of the clip from the first surface causes the spine to rebound to its original resting position with respect to the base. One of ordinary skill will appreciate that this step 108 may be repeated for each clip attached to the first part.

Curing shields placed in interior compartment(s) formed by the parts may generally be difficult to access for removal. However, in a preferred embodiment one or both parts include hole(s) (e.g., hole 59 in the bottom wall 39) sized to receive a human arm for manual removal of the clip(s). It is foreseen that drip cloths may also be removed, where applicable, via the hole(s) following curing. One of ordinary skill will appreciate that step 108 may be optional in certain embodiments, for example where reuse of the clips is not desired.

Embodiments of the present invention provide for improved isolation of a faying surface during a curing process. For example, a curing shield according to an embodiment of the present invention may provide a removable barrier against adhesive drips that may be implemented in an area enclosed by assembled composite parts. For another example, the curing shield may comprise an insulation blanket protecting sensitive components and permitting application of heat in new configurations and to previously-unavailable adhesives. The curing shields may also be configured with features—including nonstick surfaces and resilient, removeable and/or rebounding clips—that enhance reusability in embodiments of the present invention.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for bonding parts, the method comprising:
   fixing a base of a clip of a curing shield to a first surface of a first part, the curing shield including a pad fixed to the clip, the clip having the base and a spine fixed to and extending away from the base and terminating at a distal end, the pad extending along at least a portion of a length of the spine between the base and the distal end;
   applying adhesive along a faying surface of one of the first part and a second part; and
   assembling the second part to the first part along the faying surface so that the distal end of the clip extends toward the second surface and the curing shield defines a pocket adjacent the faying surface at least partly enclosed by the pad.

2. The method of claim 1, wherein the pad is an insulating pad.

3. The method of claim 2, wherein the distal end of the clip contacts the second surface of the second part and the insulating pad substantially encloses and insulates the pocket.

4. The method of claim 3, further comprising applying heat to at least one of the first part and the second part adjacent the faying surface to cure the adhesive.

5. The method of claim 1, wherein the pad includes a non-stick coating for receiving adhesive drips from the faying surface during a curing process.

6. The method of claim 1, further comprising removing the base of the clip from the first surface following a curing process.

7. The method of claim 6, wherein—
fixing the base of the clip to the first surface includes applying adhesive and tape along one of the first surface and the base to form an interface and assembling the base to the first surface along the interface so that a portion of the tape is exposed,
removing the base of the clip from the first surface includes pulling the exposed portion of the tape.

8. The method of claim 6, wherein—
prior to assembly of the second part to the first part, the spine of the clip extends away from the base at a first angle,
upon assembly of the second part to the first part an acute or obtuse angle is formed between the first surface and the second surface, the distal end of the clip contacts the second surface of the second part, and the spine is bent into a second angle with respect to the base,
upon removal of the base of the clip from the first surface, the spine resiliently rebounds toward the first angle with respect to the base.

9. The method of claim 8, wherein—
the spine is bent upon assembly along a rotational axis,
the base is fixed to the first surface along a substantially planar surface of the base having an area bisected by a midline parallel to the rotational axis,
the moment of inertia about the midline of the base is at least twice the moment of inertia about the rotational axis.

10. The method of claim 6, wherein—
the assemblage of the first part and the second part defines a compartment and substantially encloses the curing shield within the compartment,
a hole is defined in one of the first part and the second part providing manual access to the compartment,
removing the base of the clip from the first surface includes manual manipulation of the base via the hole.

11. The method of claim 10, wherein one of the first part and the second part includes a bottom wall positioned below the faying surface, further comprising—
fixing bases corresponding to a plurality of additional curing shields to the first part within the compartment at intervals so that the distal end of the clip of each of the additional curing shields extends toward the second part and each of the additional curing shields defines a pocket adjacent the faying surface at least partly enclosed by the corresponding pad,
placing drip cloths on the bottom wall below spaces between adjacent curing shields prior to the curing process,
removing each of the drip cloths following the curing process via the hole,
removing the base of the clip of each of the additional curing shields from the first part via the hole following the curing process.

12. A part assembly comprising:
a first part having a first surface;
a second part having a second surface; and
a curing shield including a pad fixed to a clip, the clip having a base and a spine fixed to and extending away from the base and terminating at a distal end, the pad extending along at least a portion of a length of the spine between the base and the distal end;
wherein—
the base of the clip is fixed to the first surface,
the first part and the second part are joined together by an adhesive along a faying surface,
the distal end of the clip extends toward the second surface and the curing shield defines a pocket adjacent the faying surface at least partly enclosed by the pad.

13. The assembly of claim 12, wherein the pad is an insulating pad.

14. The assembly of claim 13, wherein the distal end of the clip contacts the second surface of the second part and the insulating pad substantially encloses and insulates the pocket.

15. The assembly of claim 12, wherein the pad includes a non-stick coating for receiving adhesive drips from the faying surface during a curing process.

16. The assembly of claim 12, wherein—
the base of the clip is fixed to the first surface by an adhesive and tape forming an interface between the first surface and the base, a portion of the tape extending beyond the interface and being exposed,
the adhesive and tape are configured for removal from the first surface via manually pulling the exposed portion of the tape.

17. The assembly of claim 16, wherein—
the first part and the second part define a compartment and substantially enclose the curing shield within the compartment,
a hole is defined in one of the first part and the second part providing manual access to the compartment.

18. The assembly of claim 17, wherein one of the first part and the second part includes a bottom wall positioned below the faying surface, further comprising—
a plurality of additional curing shields, the base of the clip of each of the additional curing shields being fixed to the first part within the compartment at intervals so that the distal end of the clip of each of the additional curing shields extends toward the second part and each of the additional curing shields defines a pocket adjacent the faying surface at least partly enclosed by the corresponding pad,
a plurality of drip cloths resting on the bottom wall below spaces between adjacent curing shields.

19. The assembly of claim 12, wherein the spine of the clip is resiliently biased to apply pressure to the second surface of the second part.

20. The assembly of claim 19, wherein—
the spine is bent along a rotational axis with respect to the base,
the base is fixed to the first surface along a substantially planar surface of the base having an area bisected by a midline parallel to the rotational axis,
the moment of inertia about the midline of the base is at least twice the moment of inertia about the rotational axis.

* * * * *